US006617888B2

(12) United States Patent
Volk

(10) Patent No.: US 6,617,888 B2
(45) Date of Patent: Sep. 9, 2003

(54) LOW SUPPLY VOLTAGE DIFFERENTIAL SIGNAL DRIVER

(75) Inventor: Andrew M. Volk, Granite Bay, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/039,260

(22) Filed: Jan. 2, 2002

(65) Prior Publication Data

US 2003/0122593 A1 Jul. 3, 2003

(51) Int. Cl.[7] .................................................. H03K 5/22
(52) U.S. Cl. ............................. 327/67; 327/65; 330/258
(58) Field of Search ............................. 327/65, 67, 77, 327/87, 89, 560–563; 330/258

(56) References Cited

U.S. PATENT DOCUMENTS

| | | | | |
|---|---|---|---|---|
| 4,105,942 A | * | 8/1978 | Henry | 330/258 |
| 5,475,323 A | * | 12/1995 | Harris et al. | 327/563 |
| 5,856,757 A | * | 1/1999 | Eschauzier | 327/552 |
| 5,859,564 A | * | 1/1999 | Sonntag et al. | 330/258 |
| 5,933,056 A | * | 8/1999 | Rothenberg | 330/252 |
| 5,939,904 A | * | 8/1999 | Fetterman et al. | 327/65 |
| 6,166,563 A | | 12/2000 | Volk et al. | |
| 6,329,843 B1 | | 12/2001 | Hirata et al. | |
| 6,369,621 B1 | * | 4/2002 | Tinsley et al. | 327/87 |
| 6,414,557 B1 | * | 7/2002 | Liu | 327/261 |

FOREIGN PATENT DOCUMENTS

| | | |
|---|---|---|
| EP | 0812068 | 12/1997 |
| EP | 0938187 | 8/1999 |
| WO | WO 9828886 | 7/1998 |

OTHER PUBLICATIONS

US patent application, Ser. No. 09/451,684, entitled "Input-Output Bus Interface," by Dabral et al.

* cited by examiner

Primary Examiner—Toan Tran
(74) Attorney, Agent, or Firm—Blakely, Sokoloff, Taylor & Zafman LLP

(57) ABSTRACT

The invention provides a low voltage differential signaling driver (LVDS) which can operate with a lower supply voltage than conventional LVDS drivers. The common-mode voltage of the driver circuit is set to a certain level, or maintained within a certain range, by adjusting the driver current, the pull-up resistance, or both. In one implementation, the common-mode voltage of a differential driver circuit is regulated via a feedback signal.

32 Claims, 7 Drawing Sheets

LOW SUPPLY VOLTAGE DIFFERENTIAL SIGNAL DRIVER

FIELD

The invention pertains generally to differential signal drivers. More particularly, one embodiment of the invention relates to transistor-based low voltage differential signaling driver circuits.

BACKGROUND

Various types of data transmission schemes, within a device or between two or more devices, have been developed.

One type of data transmission is differential data transmission in which the difference in voltage levels between two signal lines forms the transmitted signal. For example, differential data transmission is commonly used for data transmission rates greater than 100 Mbps over long distances.

Driver circuits are employed to place and drive signals on a transmission line or medium. Low voltage differential signaling (LVDS) drivers are commonly employed in many applications including driving signals from a transmitter to a receiver. Typical LVDS drivers may permit high speed transmissions, use low power, have low electromagnetic interference (EMI), and are low in cost.

An example of a conventional LVDS driver circuit 100 is shown in FIG. 1. The difference in voltage between the output signals OUT+ and OUT− form the pair of differential signals. A pair of differential signals means two signals whose current waveforms are one hundred eighty degrees (180°) out of phase with one another.

The LVDS driver circuit 100 includes a first direct current (DC) constant current source I1 coupled to a voltage supply $V_{DD}$, two p-channel metal oxide semiconductors (PMOS) P1 and P2, two n-channel metal oxide semiconductor (NMOS) N1 and N2 (differential pairs), and a second DC constant current source I2 coupled between a common node COM and ground. The our differential pair transistors P1, P2, N1, and N2 are controlled by input voltage signals D+ and D− and direct current through load resistor $R_{LOAD}$ as indicated by arrows A and B. The input voltage signals D+ and D− are typically rail-to-rail voltage swings.

The operation of the LVDS driver circuit 100 is explained as follows. Two of the four transistors P1, P2, N1, and N2 turn ON at the same time to steer current from current sources I1 and I2 to generate a voltage across resistive load $R_{LOAD}$. To steer current through resistive load $R_{LOAD}$ in the direction indicated by arrow A, input signal D+ goes high turning ON transistor N1 and turning OFF transistor P1, and input signal D− simultaneously goes low turning ON transistor P2 and turning OFF transistor N2.

Conversely, to steer current through resistive load $R_{LOAD}$ in the direction indicated by arrow B, input signal D− goes high to turn ON transistor N2 and turn OFF transistor P2, input signal D+ goes low to turn ON transistor P1 and turn OFF transistor N1. As a result, a full differential output voltage swing can be achieved.

Differential LVDS driver circuit 100 works well as long as the output voltage swing stays within the allowable common mode voltage range, usually a few volts.

This driver 100 has the advantage of providing good power supply rejection. Common-mode voltage $V_{CM}$ is established by an external bias voltage through resistor R1.

Ideally, common-mode voltage is maintained at a certain level or within a certain range. In many driver applications, a common-mode of 1.25 volts is employed.

One disadvantage of this driver 100 is that it requires higher power supply levels to keep the transistors properly biased. The transistors that form the current sources I1 and I2 must have sufficient voltage across them to be in saturation. The differential pairs P1, P2 and N1, N2 have a minimum voltage drop associated with the output current and channel resistance. Finally, all of this has to remain properly biased throughout the output signal swing range. Some margin must be added to allow the driver to work over all process, voltage and temperature (PVT) variations. This biasing requirement applies to the CMOS circuit shown or for bipolar junction transistors. For example, a typical LVDS push-pull driver requires at least a 2.5-volt supply to remain properly biased around a 1.25-volt nominal common-mode level.

Thus, the supply voltage level required by conventional LVDS drivers restrict development of lower power applications and devices with power supplies lower than 2.5 volts.

DETAILED DESCRIPTION

In the following detailed description of the invention, numerous specific details are set forth in order to provide a thorough understanding of the invention. However, the invention may be practiced without these specific details. In other instances, well known methods, procedures, and/or components have not been described in detail so as not to unnecessarily obscure aspects of the invention.

The invention provides a low voltage push-pull differential pair signal driver with low supply voltage. One aspect of the invention permits an LVDS driver to operate supply voltage lower than the conventional 2.5 volts. In one implementation of the invention, the driver operates from a 1.5 to 1.8 volt supply voltage.

Figure 1:
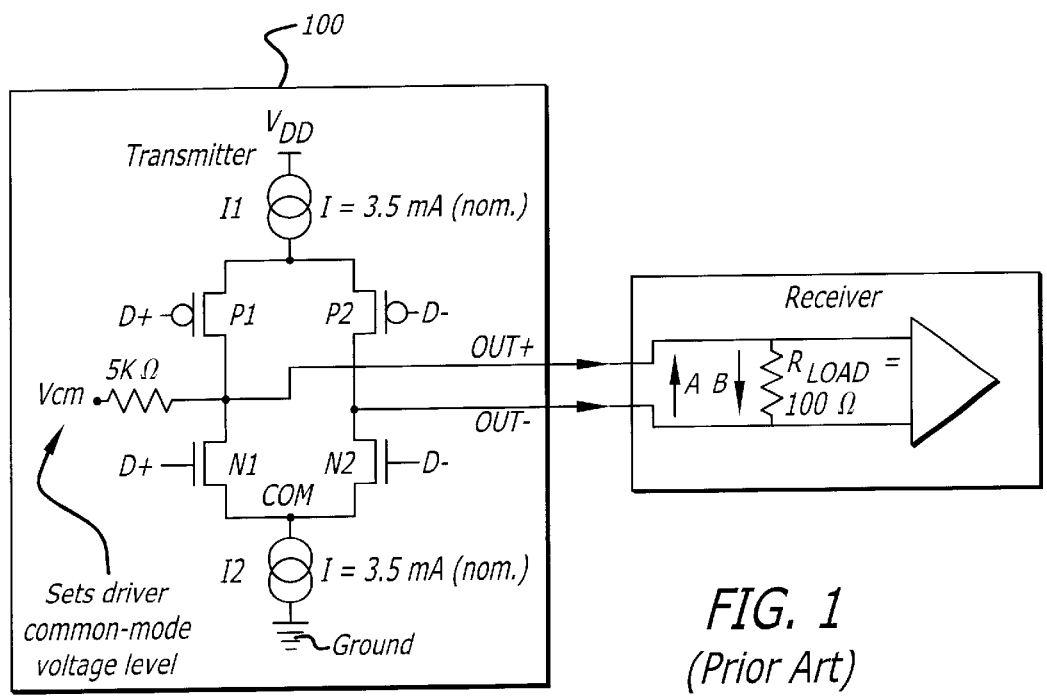
FIG. 1 is a circuit diagram illustrating one implementation of a conventional low voltage differential signaling (LVDS) driver.
Figure 2:
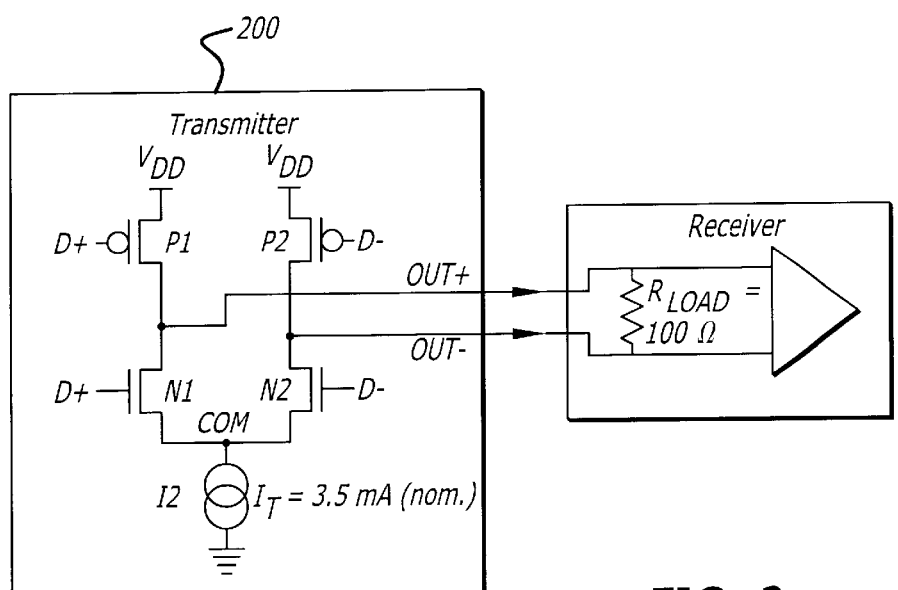
FIG. 2 is a circuit diagram illustrating a LVDS driver with lower supply voltage requirements than conventional LVDS drivers according to one implementation of the invention.

Referring to FIG. 2, an embodiment of a low supply voltage LDVS driver according to one aspect of the invention is illustrated. As with the conventional driver illustrated in FIG. 1, transistors P1, N1 and P2, N2 behave as current steering switches to drive current through a resistive load $R_{LOAD}$ based on the state of input signals D+ and D−. However, rather than using two current sources, the invention employs a single constant current source I2. Additionally, no external voltage bias is necessary to set the driver's common-mode voltage level.

Just a single current source I2 is needed if the supply voltage is quiet (low noise) and the common-mode voltage can be set by different means. Removal of the current source I1 (in FIG. 1) from the driver circuit in FIG. 2 permits use of a lower supply voltage.

The reason why a lower supply voltage can be used in the driver circuit of FIG. 2 is as follows. The current source I1 (usually made up of one or more transistors) needs a minimum amount of voltage across it to remain saturated such that it acts as a substantially constant current source. This voltage is no longer required, thus enabling the use of a lower supply voltage.

However, the removal of the external common-mode voltage $V_{CM}$ bias (in FIG. 1) necessitates a different means of setting the common-mode voltage for the circuit.

The common-mode voltage $V_{CM}$ for the driver circuit 200 is determined as follows. If the pull-up switches P1 and P2 have an equivalent impedance of $R_{PU}$, $I_T$ is the total driver current, and $R_{LOAD}$ is the shunt resistance at the receiver, then the common-mode voltage $V_{CM}$ for the driver circuit is:

$$V_{cm} = \frac{V_{OH} + V_{OL}}{2} = \frac{(V_{DD} - I_T \times (R_{LOAD} + R_{PU})) + (V_{DD} - I_T \times R_{PU})}{2}$$

$$V_{cm} = V_{DD} - 0.5 * I_T * R_{LOAD} - I_T * R_{PU}$$

Figure 3:
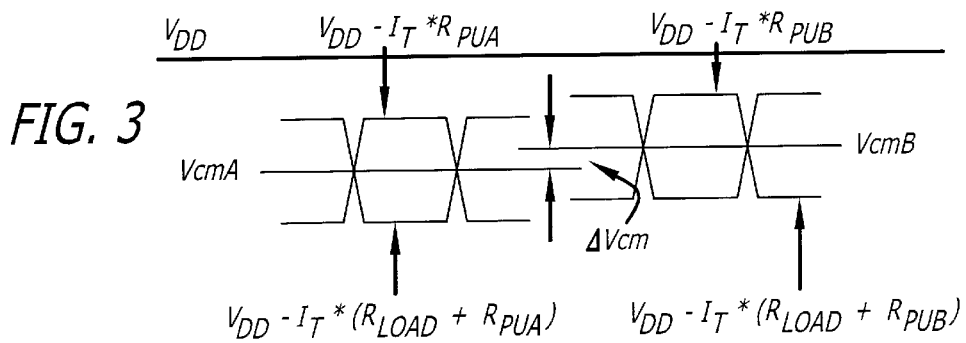
FIG. 3 is a signal diagram illustrating how increasing the product of pull-up resistance and driver current lowers the common-mode voltage.

Thus, common-mode voltage $V_{CM}$ can be controlled by either controlling the pull-up impedance $R_{PU}$, the driver current $I_T$, or both FIG. 3 illustrates how increasing the product of pull-up impedance $R_{PU}$ and driver current $I_T$ lowers the common-mode voltage from $V_{CM}$ B to $V_{CM}$ A.

According to one aspect of the invention, driver current $I_T$ is controlled to maintain the common-mode voltage $V_{CM}$ at a certain level or within a certain range.

Figure 4:
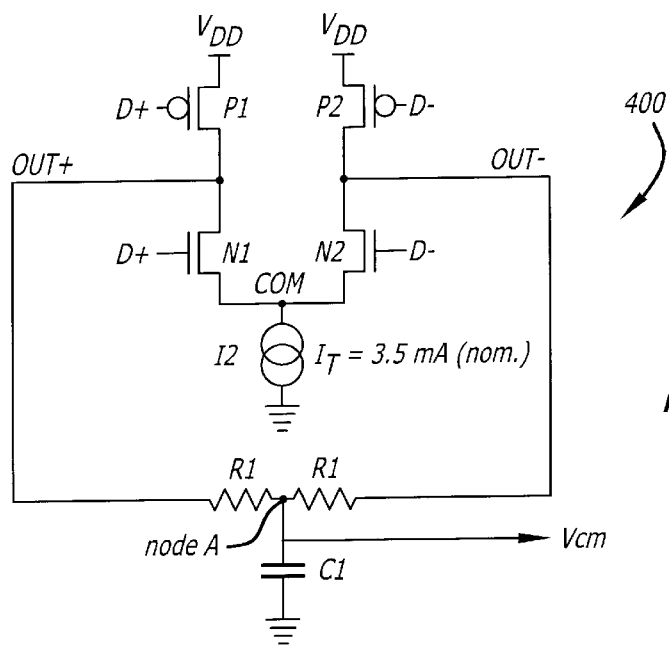
FIG. 4 is a circuit diagram illustrating a LVDS driver with lower supply voltage requirements than conventional LVDS drivers according to one implementation of the invention.

FIG. 4 illustrates how common-mode voltage may be measured from the output signal of the LVDS driver 200 in FIG. 2. Two resistors R1 are coupled to the differential pair (between P1, N1 and P2, N2) at a first end. The second end of the resistors R1 are coupled to a node A. A capacitor C1 is coupled from node A to ground to form a low-pass filter. The common-mode voltage $V_{CM}$ is measured at node A. The R1–C1 filter time constant is set to be several times the rise and fall time of the signaling edge. Typically, the value of R1 is significantly higher (e.g. by at least a factor of ten) than $R_{LOAD}$ to minimize driver current flow through the filter.

Figure 5:
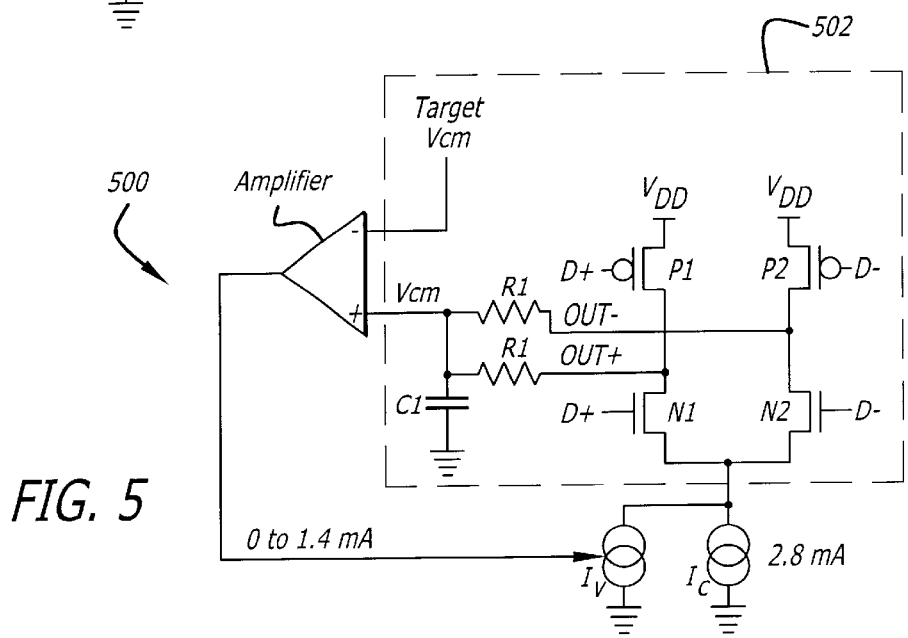
FIG. 5 is a circuit diagram illustrating a LVDS driver with a feedback signal to digitally adjust the driver current according to one implementation of the invention.

FIG. 5 illustrates a current-controlled LVDS driver according to one embodiment of the invention. A LVDS driver circuit like that of FIG. 4 is coupled to a voltage amplifier. The actual common-mode voltage $V_{CM}$ and a target common-mode voltage (target $V_{CM}$) serve as inputs to the amplifier. The actual common-mode voltage $V_{CM}$ is compared against the target common-mode voltage (target $V_{CM}$) and an analog output voltage is provided by the amplifier. Based on the amplifier's output voltage, the tail current (in particular $I_V$) is adjusted up or down, and within operational limits, to bring the actual common-mode voltage $V_{CM}$ to the same level as the target common-mode voltage (Target $V_{CM}$).

According to one implementation, the current source I2 in FIG. 4 is replaced by a constant current source $I_C$ and a variable current source $I_V$ in driver circuit 500. The constant current source $I_C$ to provide a minimum desired current flow while the variable current source Iv to provide from zero to some maximum current. The total maximum current is the sum of the constant current source $I_C$ and the maximum of the variable current source $I_V$. The current from the variable current source $I_V$ is adjusted (increased or decreased) by the output of the amplifier (an analog feedback signal) to bring the actual common-mode voltage $V_{CM}$ to the target level (Target $V_{CM}$).

The extent of the driver current and voltage swing limits are set as required by the implementation. For example, a LVDS signal driver may permit a voltage swing of 0.25 to 0.45 volts into a 100-Ohm impedance ($R_{LOAD}$) and a current swing between 2.8 and 4.2 mA, which includes a 0.3 mA safety margin. If the actual common-mode voltage $V_{CM}$ falls below the target level (Target $V_{CM}$), the total driver current is reduced until it hits the minimum value allowed (e.g. 2.8 mA in this example). Conversely, if the common-mode voltage $V_{CM}$ is above the target level, the total driver current is increased until it hits the maximum value allowed (e.g. 4.2 mA in this example).

Figure 6:
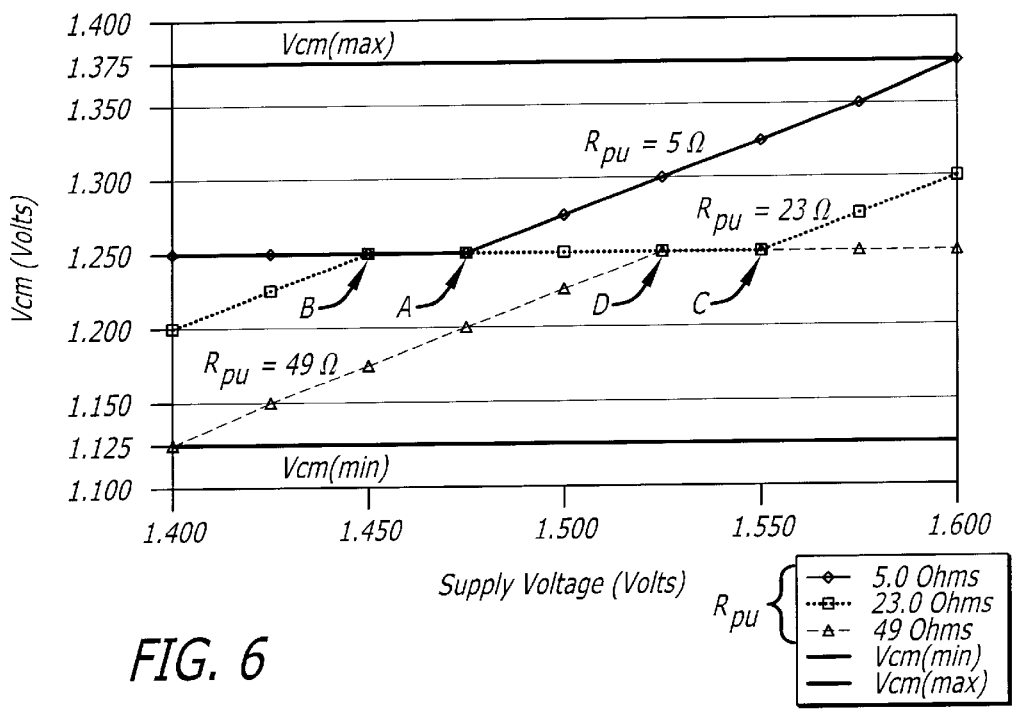
FIG. 6 is a graph of the common mode voltage versus supply voltage (1.5 volts) for various pull-up resistance values for a driver circuit according to one implementation of the invention.
Figure 7:
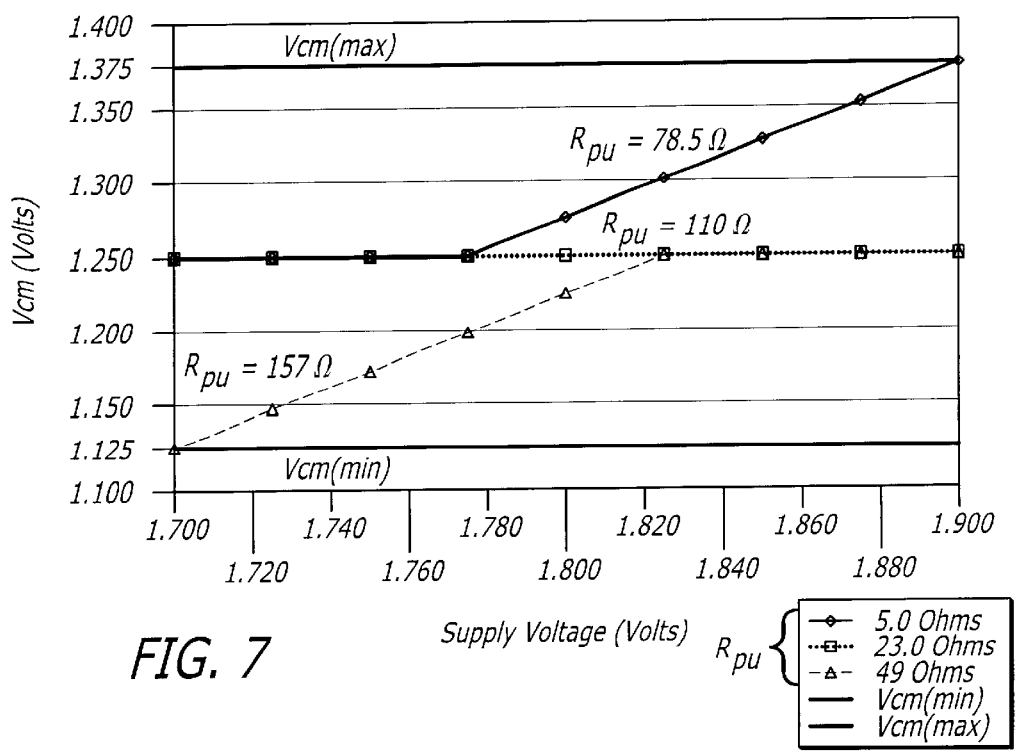
FIG. 7 is a graph of the common mode voltage versus supply voltage (1.8 volts) for various pull-up resistance values for a driver circuit according to one implementation of the invention.

FIGS. 6 and 7 are graphs illustrating examples common-mode voltage $V_{CM}$ versus supply voltage (e.g. $V_{DD}$ in the driver circuits of FIGS. 2, 4, and 5) for two supply voltages (either 1.5 volts or 1.8 volts) over the range of effective resistances $R_{PU}$ allowed for the pull-up devices transistors P1 and P2. Pull-up resistance $R_{PU}$ is measured across pull-up switches P1 or P2 (in FIGS. 2, 4, 5) and is a function of the voltage difference across the drain to source of the switch and the PVT conditions.

For these illustrations, the implementation specifies a maximum and minimum allowable common-mode voltage, $V_{CM}$ (max) and $V_{CM}$(min) respectively. For example, $V_{CM}$ (max) may be 1.375 volts and $V_{CM}$(min) may be 1.125 volts.

FIG. 6 illustrates how the common-mode voltage $V_{CM}$ varies with relation to supply voltages in the region of 1.4 to 1.6 volts over a range of pull-up resistance $R_{PU}$ (e.g. 5, 23, and 49-Ohms). For a fixed resistance (e.g. 5-Ohms), as the supply voltage $V_{DD}$ increases so does the common-mode voltage $V_{CM}$. By regulating the driver current, driver pull-up resistance, supply voltage, and/or any combination therein, the invention maintains the common-mode voltage within a specified range (e.g. 1.125 volts to 1.375 volts). For example, for a fixed effective pull-up resistance $R_{PU}$ of 5 Ohms, the invention maintains the common-mode voltage $V_{CM}$ at approximately 1.25 volts for a supply voltage $V_{DD}$ of 1.4 volts to approximately 1.475 volts (point A). At point A, the maximum driver current is reached and the common-mode voltage $V_{CM}$ increases as the supply voltage $V_{DD}$ increases.

Similarly, for a fixed effective pull-up resistance $R_{PU}$ of 23-Ohms, the invention maintains the common-mode voltage $V_{CM}$ at approximately 1.25 volts for a supply voltage $V_{DD}$ of 1.45 volts (point B) to approximately 1.55 volts (point C). Between 1.4 volts and 1.45 volts (point B), the minimum driver current is reached (for the given supply voltage) and the common-mode voltage $V_{CM}$ decreases as the supply voltage $V_{DD}$ decreases. From 1.55 volts (point C) to 1.6 volts the maximum driver current is reached and the common-mode voltage $V_{CM}$ increases as the supply voltage increases.

Similarly, for a fixed effective pull-up resistance $R_{PU}$ of 49-Ohms, the invention maintains the common-mode voltage $V_{CM}$ at approximately 1.25 volts for a supply voltage $V_{DD}$ of 1.525 volts (point D) to approximately 1.6 volts. Between 1.4 volts and 1.525 volts (point D), driver current increases from its minimum (for a 1.4 volt supply voltage) to reach a sustainable level for a supply voltage of approximately 1.525 volts.

FIG. 7 provides further examples of the performance of a driver circuit according to one implementation of the invention with supply voltage of 1.8 volts and for effective pull-up resistances $R_{PU}$ of 78.5, 110, and 157-Ohms. As described with reference to FIG. 6, the common-mode voltage is maintained within a range (e.g. 1.125 to 1.375 volts) for a given supply voltage $V_{DD}$.

It must be clearly understood that the exemplary graphs shown in FIGS. 6 and 7 are merely illustrative of the performance of one embodiment of a driver circuit according to the invention and for a given set of requirements. The common-mode voltage versus supply voltage performance of different implementations of the driver circuit disclosed herein can be made to vary as needed in different implementations by adjusting the pull-up resistance, maximum/minimum current specifications, and/other factors.

Figure 8:
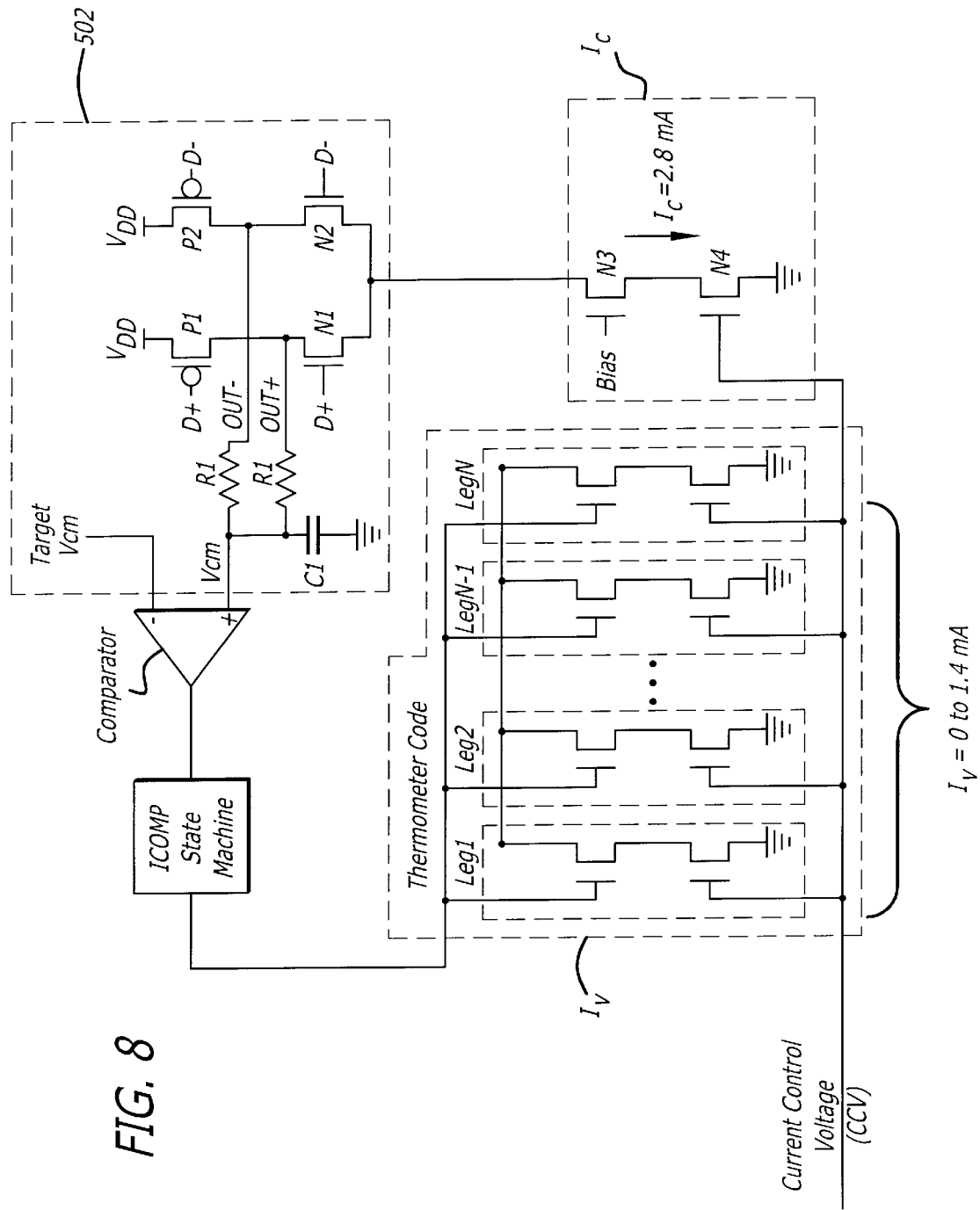
FIG. 8 is a circuit diagram illustrating a LVDS driver with a feedback signal to adjust the driver current according to another implementation of the invention.
Figure 9:
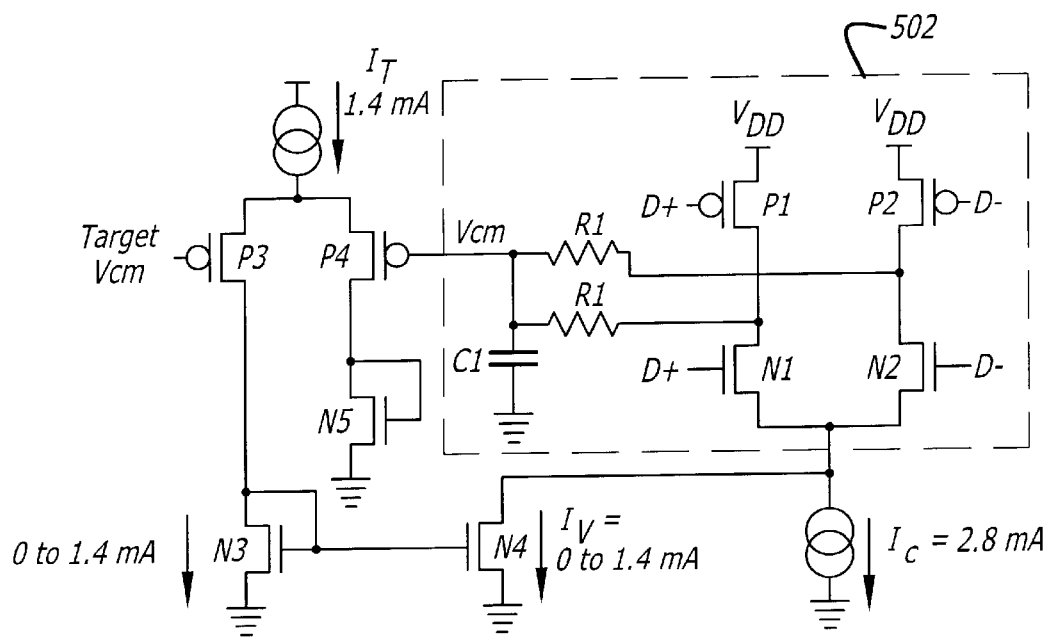
FIG. 9 is a circuit diagram illustrating a LVDS driver with an analog signal to adjust the driver current according to another implementation of the invention.

FIGS. 8 and 9 illustrate various ways of adjusting the driver current for current-controlled LVDS drivers according to two embodiments of the invention.

Referring to FIG. 8, the driver circuit 500 of FIG. 5 is illustrated with a digitally controlled compensation state machine (ICOMP) to control driver current. The fixed current source $I_C$ is implemented using two transistors in series, N3 and N4, which are biased to provide a minimum constant current. In one implementation, the minimum constant current $I_C$ is 2.8 mA. The total driver current is the sum of the current from the constant current source $I_C$ and the variable current source $I_V$.

The variable current source Iv is implemented using N legs of switched current sources enabled in sequence by a N-bit thermometer code (e.g. 00 ... 001, 00 ... 011, 00 ... 111, etc.). A state machine (ICOMP) is coupled to the output of the comparator which indicates whether the actual common-mode voltage $V_{CM}$ is above or below the target common-mode voltage (Target $V_{CM}$). In one implementation, the comparator provides either a High or Low signal (defined as voltage or current levels or ranges) to indicate the direction in which the actual common-mode voltage needs to be adjusted. An indefinite mid-level signal (between High and Low) may be employed to indicate that the actual common-voltage $V_{CM}$ is substantially the same as the desired common-mode voltage (Target $V_{CM}$) The state machine uses this information to adjust one or more current source pairs (Leg1, Leg2 ... LenN−1, Leg N) to increase or decrease the current contribution from the variable current source $I_V$ in small steps thereby adjusting the actual common-mode voltage $V_{CM}$.

According various implementations of the thermometer code legs (Leg1, Leg2 ... LenN−1, Leg N), they may be designed so that there is a logarithmic and/or linear relationship between the legs. This relationship determines the amount of current that flows through any particular leg. For instance, in one implementation, Leg2 may have the same current of Leg1 and so on. In a second implementation, Leg2 may have a current which is a fixed percent above the current of Leg 1. The current of subsequent legs may increase by a similar value and/or percentage.

In one implementation, the state machine controls the bias to each leg individually to provide the desired current $I_V$. For instance, the state machine may turn ON some legs (e.g. Leg1 and Leg2) to provide the desired current $I_V$ while other legs (e.g. LegN−1 and LegN) remain turned OFF.

The number of legs employed may vary depending on the implementation and desired step size. The step size is the amount of current contributed by each leg.

According to one embodiment, the one or more legs of the variable current source $I_V$ are configured to provide from zero (0) to 1.4 mA of combined total current.

A current control voltage (CCV) input sets the basic current level in the $I_C$ and each $I_V$ current source. It may also serve to turn ON and/or OFF the current sources $I_C$ and $I_V$ as desired.

Referring to FIG. 9, a circuit diagram illustrating an analog means of controlling the driver current is shown. A differential amplifier made up of P3 and P4 steers the tail current $I_T$ towards or away from the current mirror N3. The current in N3 is mirrored into N4 and added to the constant current $I_C$. Care must be taken with the gain-bandwidth of the current control loop to be sure it is stable.

The current mirror formed by N3 and N4 provides a way to adjust the driver current via a variable current source Iv formed by N4.

When the common-mode voltage $V_{CM}$ is higher than the target common-mode voltage (Target $V_{CM}$), more current is steered through P3 than P4 (assuming P3 and P4 are PMOS devices the increase in the P1 gate voltage causes less current to flow through P1). This causes an increase in the current $I_V$ from the variable current source N4. As discussed above, an increase in the total driver current ($I_C+I_V$) lowers the common-mode voltage $V_{CM}$. This continues until the actual common-mode voltage $V_{CM}$ equals the target common-mode voltage.

Similarly, when the common-mode voltage $V_{CM}$ is lower than the target common-mode voltage (Target $V_{CM}$), less current is steered through P3 than P4 (assuming P3 and P4 are PMOS devices the decrease in the P1 gate voltage causes more current to flow through P3). This causes a decrease in the current $I_V$ from the variable current source N4. As discussed above, a decrease in the total driver current ($I_C+I_V$) increases the common-mode voltage $V_{CM}$. As before, this continues until the actual common-mode voltage $V_{CM}$ equals the target common-mode voltage (Target $V_{CM}$)

According to another aspect of the invention, the common-mode voltage $V_{CM}$ may be controlled by adjusting the pull-up resistance $R_{PU}$ while maintaining the total driver current substantially constant.

Figure 10:
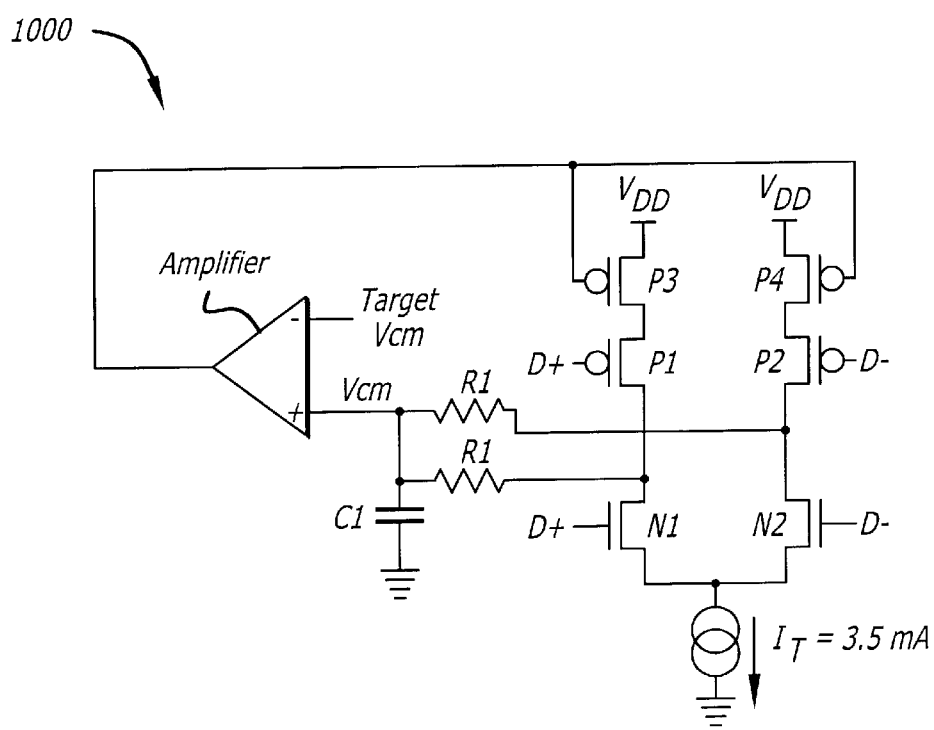
FIG. 10 is a circuit diagram illustrating a LVDS driver with a feedback signal to adjust driver resistance according to another implementation of the invention.

FIG. 10 is another driver circuit 1000 illustrating another aspect of the invention. The pull-up resistance $R_{PU}$ can be adjusted to provide the desired common-mode voltage $V_{CM}$ according to one embodiment of the invention. Transistors P3 and P4 serve as variable pull-up resistors $R_V$ while transistors P1 and P2 serve as a constant or fixed pull-up resistors $R_C$. The total pull-up resistance $R_{PU}$ is given by $R_V+R_C$.

An amplifier receives the actual (output) common-mode voltage $V_{CM}$ and a target common-mode voltage (Target $V_{CM}$) as inputs and provides an output voltage which serves to bias the gates of P3 and P4 thereby increasing or decreasing their effective impedance $R_V$.

If the common-mode voltage $V_{CM}$ is higher than the target common-mode voltage, then the amplifier increases its output voltage. This increases the gate bias voltage of P1 and P2 thereby increasing the effective pull-up resistance $R_V$. As described above, increasing the total pull-up resistance $R_{PU}$ decreases the common-mode voltage $V_{CM}$.

Conversely, if the common-mode voltage $V_{CM}$ is lower than the target common-mode voltage, then the amplifier decreases its output voltage. This decreases the gate bias voltage of P3 and P4 thereby decreasing the effective pull-up resistance $R_V$. As described above, decreasing the total pull-up resistance $R_{PU}$ increases the common-mode voltage $V_{CM}$.

Since switching an analog voltage is difficult, a second switching transistor P1 and P2 is added in series to each output to perform the current steering.

Figure 11:
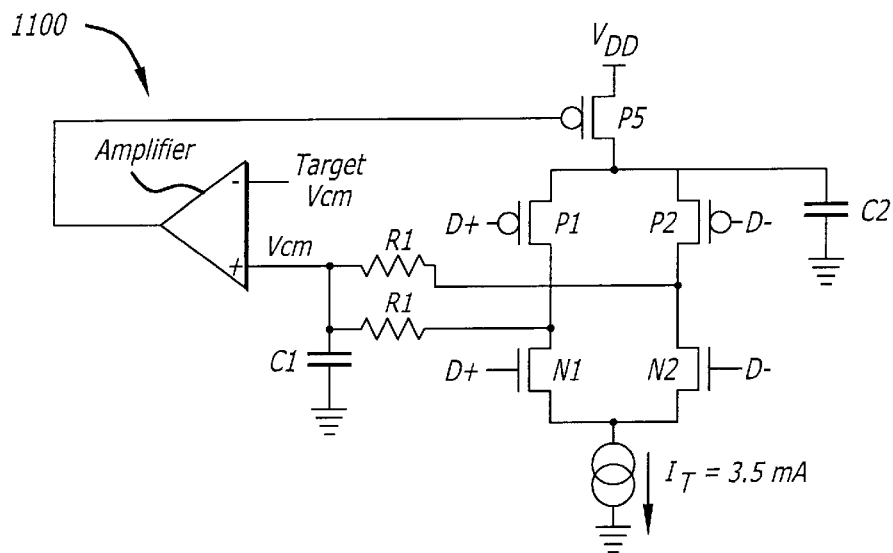
FIG. 11 is a circuit diagram illustrating a LVDS driver with a feedback signal to adjust driver resistance according to yet another implementation of the invention.

FIG. 11 shows another embodiment of the driver circuit shown in FIG. 10 in which the drains of P3 and P4 in FIG. 10 are shorted and made into one transistor P5. A capacitor C2 may be added at this point to help stabilize common-mode voltage $V_{CM}$. As with any analog closed loop, gain-bandwidth has to be controlled to ensure stability.

Figure 12:
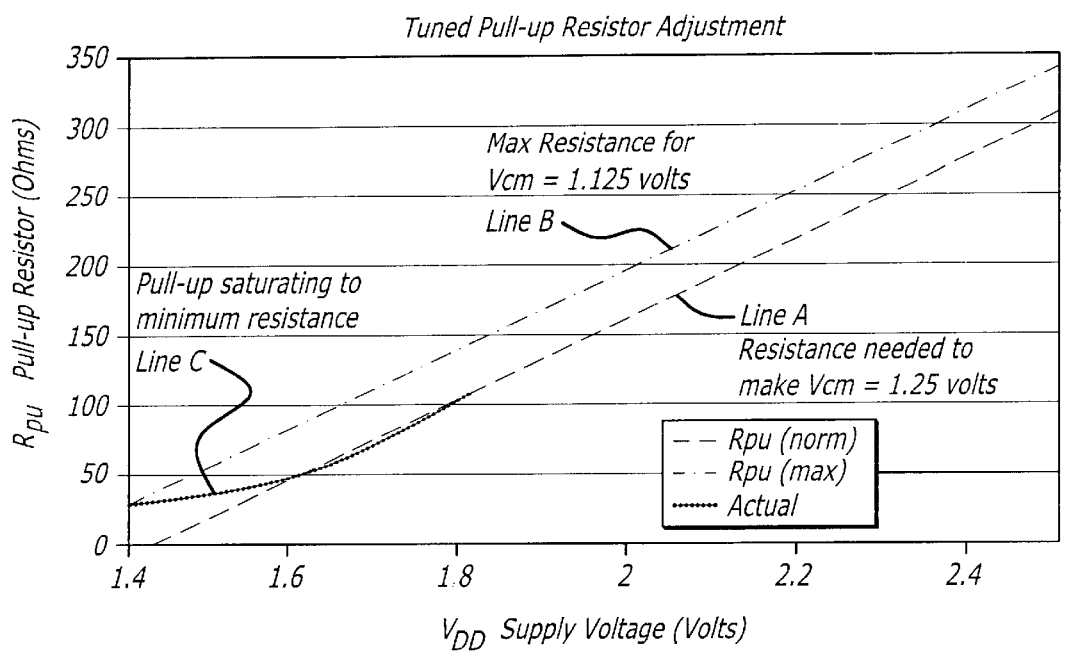
FIG. 12 is a graph illustrating the pull-up resistance versus supply voltage performance of the circuit shown in FIGS. 10 and 11.

FIG. 12 is a graph illustrating the pull-up resistance versus supply voltage performance, of the circuit shown in FIG. 10, required to stay at a specified common-mode voltage $V_{CM}$. Line A shows the $R_{PU}$ resistance needed for any $V_{DD}$ power supply to keep $V_{CM}$ at a nominal 1.25 volts. Line B shows the limit of $R_{PU}$ resistance needed to keep $V_{CM}$ above the minimum of 1.125 volts. The amplifier in FIG. 10 will hold the value of $R_{PU}$ on line A until the output voltage of the amplifier gets to its lowest output voltage. For power supply values below approximately 1.6 volts, a very low pull-up resistance $R_{PU}$ is needed. However, there is a practical minimum resistance for transistors based on area and cost. Once the minimum resistance for the PVT of the pull-up resistor (e.g. transistors P3 and P4 in FIG. 10) is reached, $V_{CM}$ will decrease. Thus, in the example illustrated in FIG. 12, Line C shows the resistance of $R_{PU}$ as transistor P5 starts to enter saturation at about 1.6 volts and hits a minimum of about 30 ohms. This allows the supply voltage $V_{DD}$ to go as low as 1.4 volts before $V_{CM}$ hits its minimum value of 1.125 volts.

Figure 13:
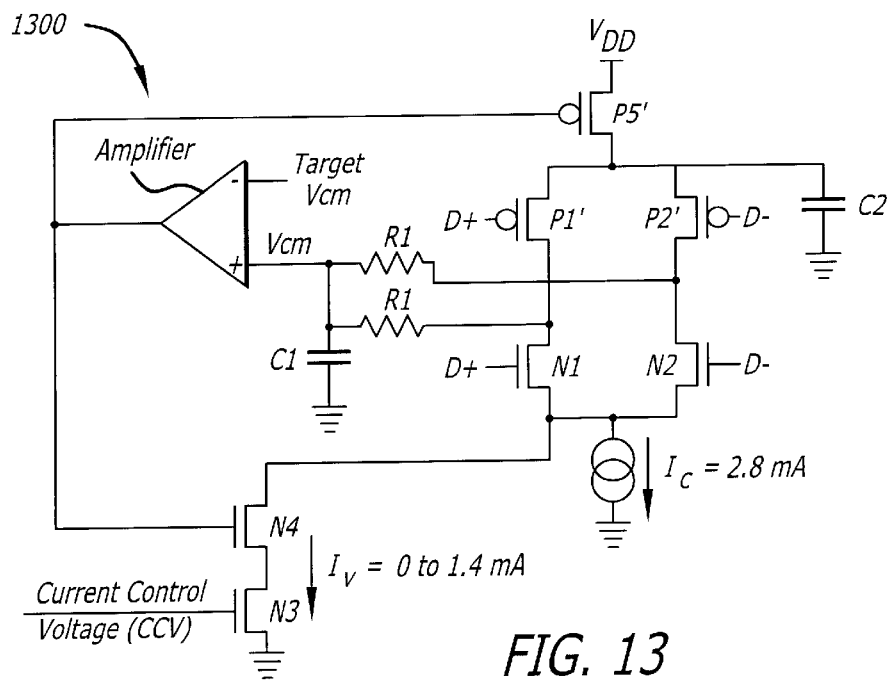
FIG. 13 is a circuit diagram illustrating a LVDS driver with a feedback signal to adjust driver resistance and total driver current according to another implementation of the invention.

In FIG. 13, a driver circuit 1300 like that shown in FIG. 11 is illustrated. The pull-up resistance $R_{PU}$ is still adjusted by the output voltage of the amplifier. In this embodiment of the invention, the current through the driver is also adjusted to further widen the operational range of the driver. As in the driver circuit in FIG. 11, transistor P5' serves as a variable pull-up resistor $R_V$ while transistor P1 ' and P2' serve as switches, fixed pull-up resistors $R_C$. Th total pull-up resistance $R_{PU}$ is given by $R_V+R_C$. An amplifier receives the actual (output) common-mode voltage $V_{CM}$ and a target common-mode voltage (Target $V_{CM}$) as inputs and provides an output voltage which serves to bias the gate of P5' thereby increasing or decreasing its effective impedance $R_V$. The current $I_T$ is split into $I_C$ and $I_V$ as in FIGS. 5 and 9. The transistor N4 setting the current in the $I_V$ leg has transistor N3 in series with it. The amplifier output voltage drives transistor N3.

When the output voltage of the amplifier is getting close to its lowest output voltage near ground, the resistance $R_V$ of P1' is getting close to its minimum value (largest gate to source voltage). At the same time, the gate voltage of transistor N3 is getting lower and its source voltage is getting lower. If the voltage across transistor N4 drops below the $V_{DS}$ (saturation) of N4, the transistor N4 comes out of saturation and the current $I_V$ through N4 decreases. As current $I_V$ drops, $V_{CM}$ tends to rise which holds $V_{CM}$ up as the resistance of $R_{PU}$ drops with the drop in the amplifier output voltage.

Current $I_V$ will go to zero when the amplifier output voltage drops below the threshold of transistor N3, leaving the minimum driver current $I_C$.

Figure 14:
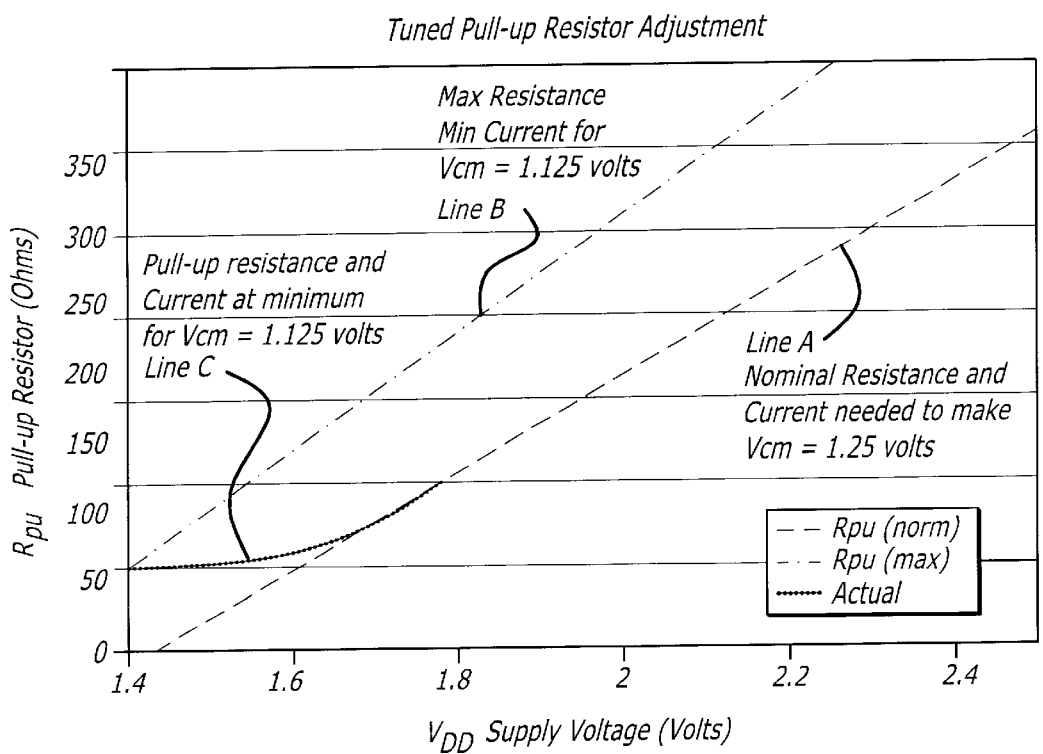
FIG. 14 is a graph illustrating the pull-up resistance and current versus supply voltage performance of the circuit shown in FIG. 13.

FIG. 14 is a graph illustrating the effects of pull-up resistance $R_{PU}$ and driver current $I_T$ versus supply voltage performance, for the circuit shown in FIG. 13. Line A shows the $R_{PU}$ resistance needed for any $V_{DD}$ power supply to keep the common-mode voltage $V_{CM}$ at a nominal 1.25 volts, and is the same as in FIG. 12. Line B shows the limit of $R_{PU}$ resistance needed to keep common-mode voltage $V_{CM}$ above the minimum of 1.125 volts with a minimum driver current $I_C$. The amplifier in FIG. 10 will hold the value of $R_{PU}$ on line A until the output voltage of the amplifier gets close to its lowest output voltage. At this point, the driver current will start decreasing along with $R_{PU}$, helping keep $V_{CM}$ from dropping below its minimum value. The minimum $R_{PU}$ resistance is about 50 ohms in this example. Due to the dual approach of regulating driver current and pull-up resistance, the transistors P1', P2' and P5' in FIG. 13 can be a smaller size than transistors P1, P2, and P5 respectively in FIG. 11, thus saving area and cost.

While the exemplary driver circuits illustrated above have employed various PMOS and NMOS transistors, it is to be understood that other equivalent configurations using other types of transistors or a different combination of transistors may be employed without deviating from the invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, software or a combination thereof.

What is claimed is:

1. A driver comprising:
   a voltage source;
   current source with one end coupled to ground;
   two differential current steering transistor legs to drive a signal, each leg including at least two transistors coupled in series, one end of each leg coupled to the voltage source and the other end of each leg coupled to the current source, the output for each leg is measured where the two transistors intersect; and
   a voltage amplifier to compare the common-mode voltage at the output of the two differential current steering transistor legs to a target common-mode voltage, the amplifier to provide a feedback output voltage to adjust the common-mode voltage to the level of the target common-mode voltage;

wherein the current source includes, a first current source to provide a fixed current, and a second current source to provide a variable current, the variable current to vary according to the feedback output voltage signal from the amplifier to adjust the common-mode voltage to the level of the target common-mode voltage wherein the second current source includes a plurality of current conducting legs, each current conducting leg individually configurable to provide a desired current.

2. The driver of claim 1 wherein the voltage source provides less than 2.5 volts while maintaining the common-mode voltage at approximately 1.25 volts.

3. The driver of claim 1 wherein the voltage source provides less than or equal to 1.8 volts while maintaining the common-mode voltage at approximately 1.25 volts.

4. The driver of claim 1 wherein the output signal of the voltage amplifier serves to adjust the current source to maintain the common-mode voltage at the target common-mode voltage level.

5. The driver of claim 1 wherein the two differential current steering transistor legs include,
 a first and second transistors coupled in series, one end of the first transistor coupled to the voltage source and the second transistor coupled to the current source,
 a third and fourth transistors coupled in series with one end of the third transistor coupled to the voltage source and the fourth transistor coupled to the current source, and
 the transistors are biased such that the first and fourth transistors are conducting when the second and third transistors are non-conducting and the second and third transistors are conducting when the first and fourth transistors are non-conducting.

6. The driver of claim 5 wherein the transistors are biased by a data signal voltage.

7. The driver of claim 1 wherein the output signal of the voltage amplifier serves to adjust the voltage source to maintain the common-mode voltage at the target common-mode voltage level.

8. The driver of claim 1 wherein the output signal of the voltage amplifier serves to adjust the driver resistance to maintain the common-mode voltage at the target common-mode voltage level.

9. The driver of claim 1 wherein the output signal of the voltage amplifier serves to adjust the driver resistance and driver current to maintain the common-mode voltage at the target common-mode voltage level.

10. The driver of claim 1 further comprising:
 two resistors of equal value, the first end of each resistor coupled to the output of one of the two differential current steering transistor legs, the second ends of the resistors coupled to each other, the common-mode voltage for the driver measured where the second ends of the resistors are coupled to each other.

11. The driver of claim 1 wherein the amplifier's output voltage adjusts the effective resistance between the voltage source and the output for each leg to adjust the common-mode voltage to the level of the target common-mode voltage.

12. A differential signal driver comprising:
 means for providing a voltage source;
 means for providing a current source;
 two differential current steering transistor legs to drive a signal, each leg including at least two transistors coupled in series, one end of each leg coupled to the voltage source means and the other end of each leg coupled to the current source means, the output for each leg measured where the at least two transistors intersect; and
 means for adjusting the driver's common-mode voltage to the level of a target common-mode voltage;
 wherein said current source comprises:
  a fixed current source to provide a fixed current; and
  a second current source to provide a variable current, the variable current to vary according to the means for adjusting the driver's common-mode voltage;
  wherein the second current includes a plurality of conducting legs, each current conducting leg individually configurable to provide a desired current.

13. The driver of claim 12 wherein the means for adjusting the driver's common-mode voltage regulates the current source means to maintain target common-mode voltage level.

14. The driver of claim 12 wherein the means for adjusting the driver's common-mode voltage regulates the voltage source means to maintain the common-mode voltage at the target common-mode voltage level.

15. The driver of claim 12 wherein the means for adjusting the driver's common-mode voltage regulates the driver resistance to maintain the common-mode voltage at the target common-mode voltage level.

16. The driver of claim 12 wherein the means for adjusting the driver's common-mode voltage regulates the driver resistance and driver current to maintain the common-mode voltage at the target common-mode voltage level.

17. The driver of claim 12 wherein the voltage source means provides less than 2.5 volts while maintaining the driver's common-mode voltage at approximately 1.25 volts.

18. The driver of claim 12 wherein the voltage source means provides less than or equal to 1.8 volts while maintaining the driver's common-mode voltage at approximately 1.25 volts.

19. A method comprising:
 measuring a common-mode voltage of a differential signaling driver circuit, the differential signaling driver circuit including a plurality of current steering transistor legs, each transistor leg including a first transistor coupled to a voltage source;
 operating each first transistor in a plurality of current steering transistor legs as a voltage-controlled resistor;
 comparing the driver's common-mode voltage to a target common-mode voltage level; and
 adjusting the driver's total direct current (DC) to bring the driver's common-mode voltage to the same level as the target common-mode voltage, wherein adjusting the driver's total direct current (DC) comprises:
  providing a first current source to provide a fixed current; and
  providing a second current source to provide a variable current, the variable current being controlled to adjust the driver's common-mode voltage, wherein the second current source includes a plurality of current conducting legs, each current conducting leg individually configurable to provide a desired current.

20. The method of claim 19 wherein the total driver DC current is adjusted while keeping the effective driver resistance fixed.

21. The method of claim 19 wherein the total driver DC current is adjusted incrementally.

22. The method of claim 19 further comprising:
adjusting the driver's total pull-up resistance to bring the driver's common-mode voltage to the same level as the target common-mode voltage.

23. The method of claim 19 wherein a supply voltage of the differential signaling driver circuit is less than 2.5 volts while maintaining the driver's common-mode voltage at approximately 1.25 volts.

24. The method of claim 19 wherein a supply voltage of the differential signaling driver circuit does not exceed 1.8 volts while maintaining the driver's common-mode voltage at approximately 1.25 volts.

25. A method comprising:
measuring a common-mode voltage of a differential signaling driver circuit, the differential signaling driver circuit including a plurality of current steering transistor legs, each transistor leg including a first transistor coupled to a voltage source;
operating each first transistor in a plurality of current steering transistor legs as a voltage-controlled resistor;
comparing the driver's common-mode voltage to a target common-mode voltage; and
adjusting the resistance of the driver circuit, while keeping the driver's total direct current (DC) fixed, to bring the driver's common-mode voltage to substantially the same level as the 10 target common-mode voltage, wherein adjusting the driver's total direct current (DC) comprises:
providing a first current source to provide a fixed current; and
providing a second current source to provide a variable current, the variable current being controlled to adjust the driver's common-mode voltage, wherein the second current source includes a plurality of current conducting legs, each current conducting leg individually configurable to provide a desired current.

26. The method of claim 25 wherein adjusting the resistance of the driver circuit includes adjusting a pull-up resistance between the driver circuit and a voltage source.

27. The method of claim 25 wherein a supply voltage of the differential signaling driver circuit is less than 2.5 volts while maintaining the driver circuit's common-mode voltage at approximately 1.25 volts.

28. The method of claim 25 wherein a supply voltage of the differential signaling driver circuit is no greater than 1.8 volts while maintaining the driver circuit's common-mode voltage at approximately 1.25 volts.

29. The driver of claim 1 wherein each first transistor in each leg is operated in a linear region of the first transistor.

30. The differential signal driver of claim 12 wherein each first transistor in each transistor leg is operated in a linear region of the first transistor.

31. The method of claim 19 wherein each first transistor in each current steering transistor leg is operated in a linear region of the first transistor.

32. The method of claim 25 wherein each first transistor in each current steering transistor leg is operated in a linear region of the first transistor.

* * * * *

UNITED STATES PATENT AND TRADEMARK OFFICE
CERTIFICATE OF CORRECTION

PATENT NO.    : 6,617,888 B2
DATED         : September 9, 2003
INVENTOR(S)   : Volk It is certified that error appears in the above-identified patent and that said Letters Patent is hereby corrected as shown below:

Column 1,
Line 41, delete "our", insert -- four --.

Column 8,
Line 59, before "current source", insert -- a --.

Signed and Sealed this

Eighth Day of June, 2004

JON W. DUDAS
*Acting Director of the United States Patent and Trademark Office*